United States Patent
Braam et al.

(10) Patent No.: US 7,877,092 B2
(45) Date of Patent: Jan. 25, 2011

(54) MOBILE COMMUNICATION TERMINAL FOR SERVICE TYPE SIGNALING

(75) Inventors: Reinhold Braam, Rhede (DE); Michael Franzen, Bocholt (DE); Wolfgang Gröting, Oberhausen (DE); Gesa Lorenz, Dinslaken (DE); Sebastian Obermanns, Bocholt (DE); Malte Schmidt, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 545 days.

(21) Appl. No.: 10/595,962

(22) PCT Filed: Nov. 9, 2004

(86) PCT No.: PCT/EP2004/012672

§ 371 (c)(1),
(2), (4) Date: Jun. 21, 2006

(87) PCT Pub. No.: WO2005/060289

PCT Pub. Date: Jun. 30, 2005

(65) Prior Publication Data

US 2007/0037575 A1    Feb. 15, 2007

(30) Foreign Application Priority Data

Nov. 25, 2003    (DE) ................................. 103 54 942

(51) Int. Cl.
*H04W 4/00* (2009.01)

(52) U.S. Cl. .............. 455/435.3; 455/432.1; 455/432.3; 455/435.2

(58) Field of Classification Search .... 455/432.1–435.3
See application file for complete search history.

(56) References Cited

U.S. PATENT DOCUMENTS

| 5,613,213 | A  | * | 3/1997 | Naddell et al. ............ 455/435.2 |
| 5,903,832 | A  | * | 5/1999 | Seppanen et al. ......... 455/435.3 |
| 5,915,214 | A  |   | 6/1999 | Reece et al. |
| 6,603,755 | B1 |   | 8/2003 | Parker |
| 2002/0102978 | A1 | | 8/2002 | Yahagi |

FOREIGN PATENT DOCUMENTS

| DE | 69402327   | 8/1997 |
| EP | 0781064    | 6/1997 |
| EP | 1229751    | 8/2002 |
| WO | WO9507010  | 3/1995 |
| WO | WO0189249  | 11/2001 |

* cited by examiner

*Primary Examiner*—Lester Kincaid
*Assistant Examiner*—Mehmood B Khan
(74) *Attorney, Agent, or Firm*—King & Spalding L.L.P.

(57) ABSTRACT

A mobile communication terminal operatively coupled to at least two mobile radio communication systems in respectively associated mobile radio networks, each of which provides a user of the communication terminal with a number of services of different type. The user may thus effect efficient management of the services provided for him by virtue of the communication terminal being designed to receive and effect further processing of data records which are associated with one respective type of the services.

4 Claims, 1 Drawing Sheet

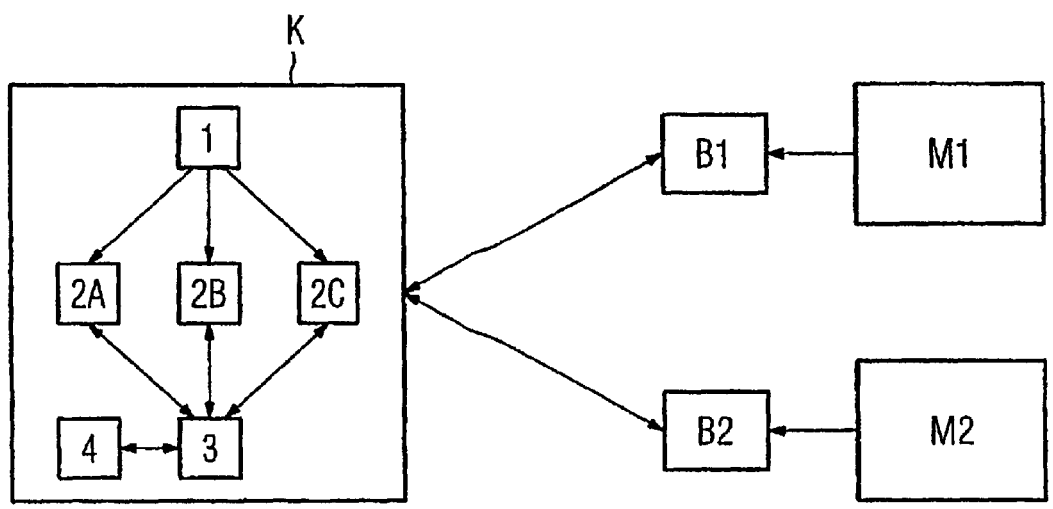

MOBILE COMMUNICATION TERMINAL FOR SERVICE TYPE SIGNALING

FIELD OF TECHNOLOGY

The present disclosure relates to a mobile communication terminal for operation for at least two mobile radio communication systems in respectively associated mobile radio networks, each of which provides a user of the communication terminal with a number of services of different type.

BACKGROUND

Communication terminals of this kind are normally "multistandard appliances" which are capable of supporting at least two mobile radio communication standards. In this case, each communication standard normally has an associated mobile radio network. Within these mobile radio networks, service servers are available, for example, which support the provision of a service for the user of the communication terminal.

By way of example, it is thus possible that one and the same mobile communication terminal is operated in a plurality of mobile radio networks and also in a WLAN system, for example. Each of these networks provides a number of services which may partially overlap in terms of their type. Currently, the user of the communication terminal must first of all select the mobile radio network or mobile radio system and then select from the services provided there.

This has the drawback that the user is barely able to obtain an overview of the services which are presented to him by the various mobile radio networks and systems.

SUMMARY

Against this background, the present disclosure is based on providing a mobile communication terminal and a mobile radio arrangement that allows the user of the communication terminal to manage services with which he is provided efficiently.

Under an exemplary embodiment, a mobile communication terminal is disclosed for operation in at least two mobile radio communication systems for respectively associated mobile radio networks, each of which provides a user of the communication terminal with a number of services of different type, where the communication terminal is designed to receive and effect further processing of data records which are associated with one respective type of the services.

A better overview of services that are provided for the user of the communication terminal by various mobile radio networks or systems is obtained from the fact that the communication terminal is able to receive and effect further processing of data records, which can be regarded as identification information about a respective service type. This is based on the fact that regardless of how diverse services presented are it will always be possible to divide these services into different types, with each type having an associated data record which shows the type of the service in a way which the communication terminal is able to evaluate.

It is possible for the use of such data records to be standardized across mobile radio standards, so that one and the same data record always specifies the same service type regardless of the respective mobile radio network or system which is being used. By way of example, a standardized data record of this kind might be based on existing standards, for example on the XML standard.

Preferably, the communication terminal is designed such that it respectively stores services of the same type which are repeatedly provided by the mobile radio networks using the data records in the communication terminal in the form of a service type list. In this embodiment, the data records, which are associated with one respective service type, are used to combine services of the same type within the communication terminal in the form of a list from which it is possible to select. It goes without saying that it is possible to provide a plurality of service types with a corresponding number of lists which are then all stored in the communication terminal.

Preferably, entries in the list of service types have different priority. This means that the communication terminal stores an order of precedence for services of the same type. The priority can be defined on the basis of an assessment criterion. By way of example, an assessment criterion of this kind is a quality for a communication link to the mobile radio network which provides the service, costs to be estimated for use of a service or the like. The assessment criterion may preferably be user-defined. In this way, the user of the communication terminal has the greatest possible influence on the respective service prioritized within a service type.

To make it particularly easy for the user of the communication terminal to select a currently desired service of a specific service type, the communication terminal may be designed such that the list associated with the service type can be shown on a display device on the communication terminal, and also selection means are provided which are used to select a service of a desired service type from the list.

The aforementioned object is achieved for the mobile radio arrangement by a mobile radio arrangement having at least two mobile radio networks, each of which has an associated mobile radio communication standard, and having at least one mobile communication terminal which is designed for operation for the at least two mobile radio communication standards, with each mobile radio network providing a user of the communication terminal with a number of services of different type, where the at least two mobile radio networks are designed for transmitting data records which are associated with one respective type of the services, and the communication terminal is designed to receive and effect further processing of the data records.

A particular feature of this mobile radio arrangement is that even different mobile radio networks or systems use the same data records in order to identify a particular service type. As already indicated above, these data records may be processed further by the communication terminal such that an order for provided services is permitted according to the type of service.

The data records may preferably contain information that allows the associated services to be assessed by the user. Such information may be costs which are to be expected, or quality features for the service, for example. Therefore, a data record associated with a service type may contain version information about the provided service.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 illustrates a schematic block diagram of a mobile radio arrangement, according to an exemplary embodiment.

DETAILED DESCRIPTION

The mobile radio arrangement shown has an exemplary communication terminal K shown in FIG. 1, which can be operated in two mobile radio networks and, to this end, is connected to a first mobile radio network M1 and to a second mobile radio network M2 via respective base stations B1 and B2.

Each of the mobile radio networks ("Core Network") contains a number of service servers which provide respective services of various type for use by the communication terminal.

In the exemplary embodiment presented, the mobile radio network M1 provides a sports information service, a weather forecasting service and a voice service. The same services are also provided within the mobile radio network M2.

When the communication terminal K registers both in the mobile radio network M1 and in the mobile radio network M2, these mobile radio networks use their respective base stations B1, B2 to signal their respectively provided services, namely the three services listed above.

This signaling is performed using data records which are standard for the two mobile radio networks M1 and M2 and denote a respective service type. In the present exemplary embodiment, a total of three service types are provided which are respectively provided by both mobile radio networks M1, M2. When the communication terminal K registers with the two mobile radio networks M1, M2, three respective data records are therefore transmitted to the communication terminal K which show that the first mobile radio network M1 provides the three services of the sports information service, the weather forecasting service and the voice service, while the same services are also provided by the second mobile radio network M2. The data records transmitted contain information, such as version numbers and/or prices, for the services which they show.

The communication terminal K receiving the data records has a service data record detection device 1 which is connected to an air interface on the communication terminal K and in this way detects the service data records. The communication terminal K also has a total of three memories 2A, 2B, 2C which are associated with one respective service type. An association of this kind may be made by the user, for example.

The memory 2A is provided for sports information services and therefore contains services and their connection data (IP addresses) which have been signaled by one of the mobile radio networks M1 and M2 to the communication terminal K using the data record for sports information services. A similar situation applies to the memories 2B, 2C for the further services of weather forecasting service and voice service.

In addition, the communication terminal K has a display device 3 which can be linked to all the memories 2A, 2B, 2C. In this case, a user of the communication terminal K can call up the content of a desired list by operating an associated input key on an input device 4. In addition, the input device 4 allows the user to make a prioritization within one of the lists which are contained in the memories 2A, 2B, 2C, so that a respective header end of one of the lists respectively displays the data for that service which is distinguished by optimum meeting of an assessment criterion which the user has stipulated, whereas the further list entries are preferably noticeable only when the first list entry is not available.

When the user wishes to use a weather forecasting service, the input device 4 serves as selection means to select the associated memory 2B, whose content is then shown on the display device 3. On the basis of its being shown, the desired service of the "weather forecasting service" type can then be selected from the list. Alternatively, it is also possible for merely the selection of the "weather forecasting service" service type to be taken as a basis for selecting the service situated at the first location in the list in the memory 2B automatically using the air interface on the communication terminal K.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A mobile communication terminal for operation of at least two mobile radio communication systems in respectively associated mobile radio networks, comprising;

each said mobile radio communication system operable to provide a user of said mobile communication terminal with a plurality of services of different types, wherein said mobile communication terminal is connected to receive and effect further processing of a plurality of data records, wherein each said data record is associated with one respective type of said services, and wherein each of the at least two mobile radio communication systems provides the mobile communication terminal at least one service of the same service type;

a plurality of service type lists, each service type list corresponding to a different one of the plurality of different service types and listing only services of one particular service type which are provided by any of said mobile radio networks, said services stored using said data records, said data records containing information used by said services to be assessed by a user;

said mobile communication terminal configured to receive user-specified service assessment criteria, and apply the user-specified criteria to the service type lists such that when a particular service type is requested by the user, the top-priority service of the particular service type, as determined according to a particular user-specified criterion, is displayed to the user in a displayed list before the other services of the particular service type, and data that distinguished the top-priority service according to the particular user-specified criterion is displayed at a header end of the displayed list.

2. The mobile communication terminal according to claim 1, wherein entries in at least one of the plurality of service type lists have different priority among each other.

3. The mobile communication terminal according to claim 2, wherein said mobile communication terminal is operable such that each service type list can be shown on a display device on said mobile communication terminal, and further comprising selection means for selecting a service of a desired service type from a displayed service type list.

4. A mobile radio system, comprising:

at least two mobile radio networks, each said mobile radio network associated with a radio communication standard, each said mobile radio network further comprising a plurality of mobile communication terminals;

wherein each said mobile communication terminal is operable for at least two mobile radio networks, each said mobile radio network providing a user of said mobile communication terminal with a plurality of services of different types;

wherein at least two said mobile radio networks are operable for transmitting data records, each said data records associated with a plurality of said services, and said data records contain information used by said services to be assessed by a user;

wherein at least two mobile radio communication systems provide the mobile communication terminal at least one service of the same service type;

wherein the data records are used in the form of a plurality of service type lists, each service type list corresponding to a different one of the plurality of different service types and listing only services of one particular service type which are provided by any of said mobile radio networks;

wherein the mobile communication terminal allows the user to specify service assessment criteria; and wherein the mobile communication terminal applies the user-specified criteria to the service type lists such that when a particular service type is requested by the user, the top-priority service of the particular service type, as determined according to a particular user-specified criterion is displayed to the user in a displayed list before the other services of the particular service type and data that distinguished the top-priority service according to the particular user-specified criterion is displayed at a header end of the displayed list.

* * * * *